Nov. 2, 1943.    C. R. WASEIGE    2,333,132
OPERATING MECHANISM FOR RETRACTABLE MEMBERS ON BOARD AIRCRAFT
Filed Aug. 4, 1939    3 Sheets-Sheet 1
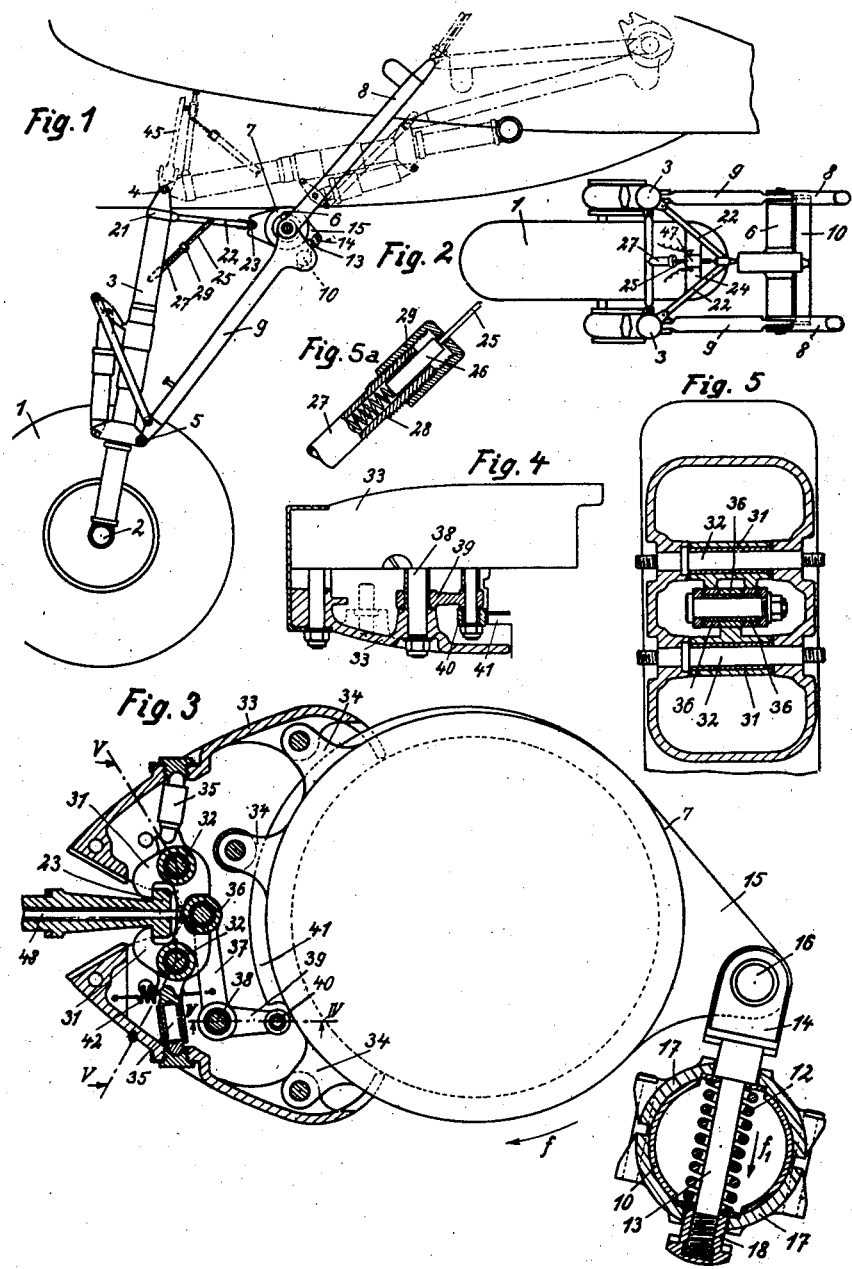

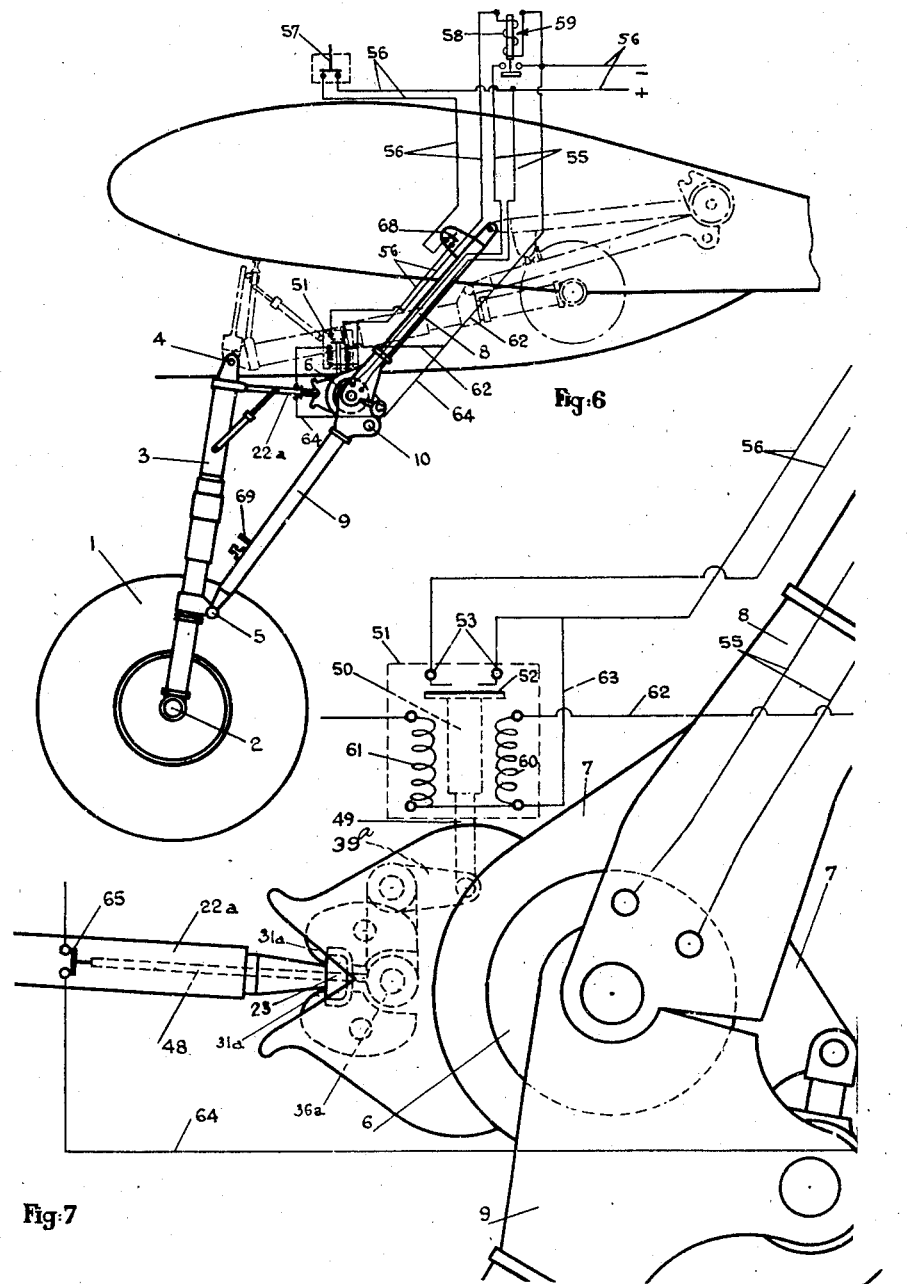

Nov. 2, 1943.  C. R. WASEIGE  2,333,132
OPERATING MECHANISM FOR RETRACTABLE MEMBERS ON BOARD AIRCRAFT
Filed Aug. 4, 1939  3 Sheets-Sheet 3
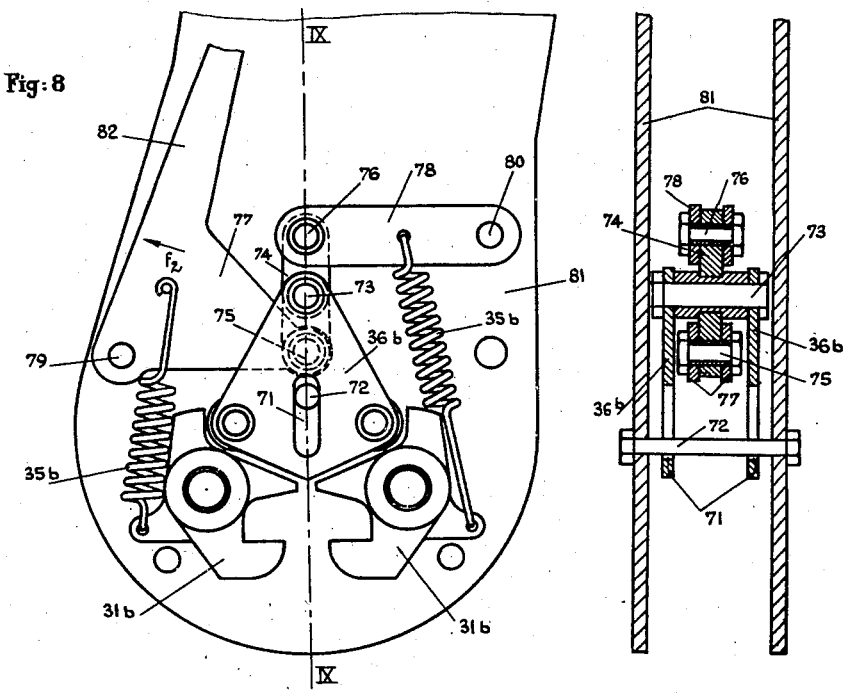
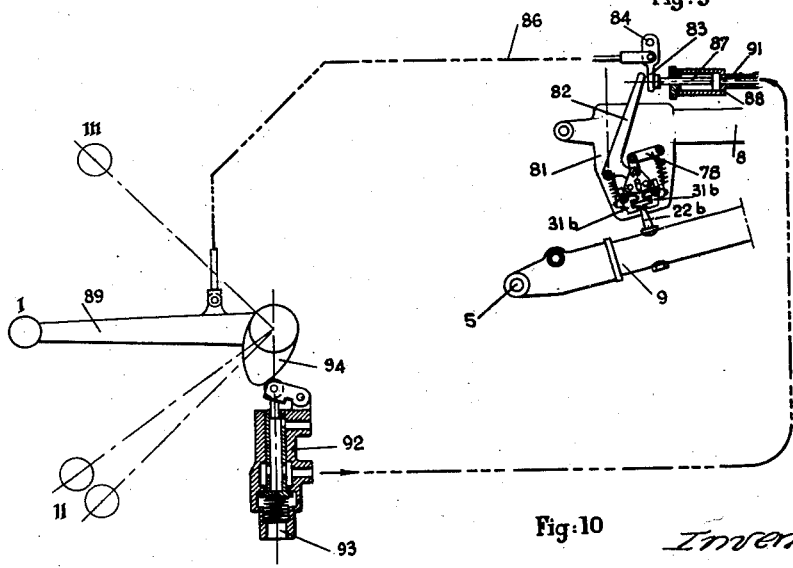
Inventor:
C. R. Waseige
By: Glascock Downing Seebold Patented Nov. 2, 1943

2,333,132

UNITED STATES PATENT OFFICE 2,333,132

OPERATING MECHANISM FOR RETRACTABLE MEMBERS ON BOARD AIRCRAFT

Charles Raymond Waseige, Rueil, France; vested in the Alien Property Custodian

Application August 4, 1939, Serial No. 288,463
In France August 12, 1938

16 Claims. (Cl. 244—102)

The present invention pertains to means for locking the operating mechanisms of retractable members on an aircraft. The retractable members may be in the form of wheels, floats, skids or the like including turrets or cupolas.

Still more specifically the invention relates to the locking devices cooperating with mechanism including bars which are pivoted on each other and thus form a deformable polygon, and more particularly to those wherein two adjacent sides that are pivoted on each other form a folding strut.

A further object of the invention is to provide, in a collapsible structure including a supporting leg and a folding strut, locking means forming between said two pieces in extended position a brace increasing the stiffness of the structure and assisting the leg in resisting the stresses transmitted by the landing wheel or the like.

By way of examples there are illustrated in the annexed drawings some embodiments of my invention as applied to the particular case of a retractable landing gear including a folding strut.

In the drawings:

Fig. 1 is a diagrammatic side view of a landing gear;

Fig. 2 is a corresponding plan view;

Fig. 3 shows partly in section, on a larger scale, a locking device for the landing gear in its landing position;

Figs. 4 and 5 are respectively sections along the lines designated by IV—IV and V—V in Fig. 3;

Fig. 5a shows at an enlarged scale a detail of Fig. 1;

Fig. 6 is a view similar to Fig. 1 of a modified embodiment and shows diagrammatically an arrangement for an electrical control of the locking device, for the landing gear in its landing position;

Fig. 7 is a view on a larger scale of a part of Fig. 6;

Fig. 8 is a view of a locking device for the landing gear in its retracted position;

Fig. 9 is a section along line IX—IX of Fig. 8, and

Fig. 10 is a diagram showing an arrangement for a duo-control of a locking device for the landing gear in its retracted position.

In the various embodiments illustrated the landing gear comprises a wheel 1 as a landing element, that is to say as a member for coming into contact with the ground. Said wheel is carried by an axle 2 which is itself supported by two parallel resilient legs 3 which are pivoted at their upper end on a fixed pin 4 of the aircraft. At an intermediate point 5 of each leg 3 is pivoted the end of one of the arms of a folding strut, the other arm of which has its end pivoted on a fixed pin of the aircraft. The closing of the folding-strut is effected by means of an actuating device which is shown herein as being of the type described in my prior Patent No. 2,148,972. Said actuating device essentially comprises a housing 6 enclosing a motor and a reducer which drives an outer case 7 capable of rotating on the housing 6. Said housing 6 is fixed by its ends on the parallel upper arms 8 of two folding struts located on either side of the wheel 1, whereas the two other arms 9 of said folding struts are connected to each other by a hollow transverse bar 10.

In the embodiment illustrated in Figs. 1–5a a resilient device connects said bar 10 to the case 7. Said resilient device herein comprises a compression spring 12 which is arranged transversely of the bar 10 inside same and in the axis of which extends a rod 13 which passes through the bar 10. One end of said rod 13 is shaped like a jaw 14 that embraces a lug 15 of the case 7 and is connected to said lug by a pin 16. Two half-collars 17, which are connected together by bolts embrace the bar 10 in register with the rod 13 and are each provided with a hole through which the rod 13 passes freely. At the opposite end to the jaw 14 a nut 18 provided with a cylindrical extension is screwed on the threaded end of the rod 13.

It is obvious that when the case 7 tends to rotate relatively to the housing 6 which is fixed to the arms 8, the lug 15 pulls or pushes the rod 13 and this stress is transmitted to the bar 10 through the spring 12. Since the bar 10 is fixed to the arms 9 of the folding strut, said arms are urged to follow the movement of the lug 15, that is to say to rotate relatively to the housing 6 and to the arms 8 about the common axis of the cases 6 and 7, thereby opening or closing the folding-strut.

On the other hand, two collars 21, which are respectively fixed on the legs 3 each carry a bar 22. These two bars 22 are connected to each other obliquely at their opposite end and form a V-shaped assembly, the apex of which carries an engaging head 23. The two bars 22 are braced by an intermediate stay 24 on which is pivoted the end of a rod 25, the other end of which carries a slide 26 lodged in a tube 27 which is pivoted to the centre of the bracing spider for the two legs 3. Inside said tube is a spring 28 which biases the slide against an adjustable abutment 29 screwed on the threaded end of the tube 27.

The position of the engaging head is therefore determined by the length of the resilient connecting link which is formed by the rod 25 and the tube 27 and is itself adjusted by the position given to the abutment 29.

With the engaging head 23 cooperate two hooks 31 which are placed opposite each other and are pivotally mounted on pins 32 carried by a case 33 bolted on lugs 34 of the case 7. Each hook 31 is urged to pivot by a resilient device 35, the line of action of which passes on one side or on the other of the corresponding pin 32 according to the position of the hook. Between the opposite tails of the hooks 31 are adapted to engage juxtaposed locking rollers 36 which prevent any swinging of the hooks 31 in one direction or in the other. Said rollers 36 are carried by an arm which is mounted on a pin 38 and rotates with an arm 39 carrying a roller 40 that co-operates with a cam 41 carried by the housing 6. The arm 37 is urged by a spring 42 towards the locking position of the hooks 31 by the roller 36.

When the undercarriage is retracted, position shown in chain dotted lines in Fig. 1, the bars 22 bear against a fixed abutment 45 of the aircraft, which keeps them near the legs 3, thereby decreasing the bulk. On the other hand, the cam 41 of the housing 6 is in contact with the roller 40 and holds the locking rollers 36 in a position in which they do not prevent the hooks 31 from swinging. When the folding formed of the arms 8 and 9 is opened by the action of the actuating means 6 and 7 or of the weight of the undercarriage or of any other retracting device, the case 7 rotates on the housing 6 in the direction $f$, and with it the case 33, so that the head 23 engages between the hooks 31 slightly before the folding strut arms 8 and 9 are completely open. Immediately thereafter the roller 40 leaves the cam 41, and the spring 42 moves the arm 37 to its locking position. The rollers 36 thus engage between the tails of the hooks 31 and compel them to move away from each other. During this swinging movement of the hooks 31, the line of action of each resilient device 35 passes on the other side of the pivot pin 32 of the corresponding hook so that same suddenly swings down behind the head 23 responsive to the action of said resilient device 35. The deformable system is thus triangulated and made undeformable by the triangulation element 22 which has hooked itself on to the actual joint of the folding strut. In order to be sure that the locking is suitably effected, the device is adjusted in such a manner that the case 7 still rotates slightly on the housing 6, after the roller 40 has left the cam 41, to complete the opening of the folding strut. The rotation of the case 7 on the housing 6 after triangulation of the deformable linkage formed by the elements 3, 8 and 9 causes the spring 12 to be compressed, the rod 13 sliding in the direction $f_1$ through the bar 10.

When the case 7 rotates in the opposite direction on the housing 6 in order to retract the undercarriage, a relaxation of the spring 12 first of all occurs, then the rod 13 tends to actuate the bar 10 and close the folding strut but as the locking device prevents this, the spring 12 is compressed, the rod 13 then sliding through the bar 10 in the opposite direction to $f_1$; meanwhile, the cam 41 encounters the roller 40 and rocks the lever 37 in order to unlock the hooks 31. The stress exerted by the rod 13 to close the folding strut causes the hooks 31 to pull the engaging head and responsive to this pull, the hooks swing backwards against the action of the resilient devices 35. Unlocking is thus effected and the hooks are kept retracted by the resilient devices 35, the line of action of each of them having changed over to the other side of the pivot pin 32 owing to the aforesaid swinging of the hooks.

A device for indicating the engagement of the triangulation element 22 is furthermore provided. Said device consists in this case of an electric switch 47 which is carried by the stay 24 and is actuated by a rod 48 that slides axially through the head 23. When the engagement is effected, the locking roller 36 pushes said rod 48 endwise and thus operates the switch 47 (Fig. 2) which closes the circuit of an indicating apparatus, a lamp for example, located on the pilot's instrument panel.

In the modified embodiment illustrated in Figs. 6 to 9, a lever 39a instead of being actuated by a cam is connected to a rod 49 carried by the core 50 of an electromagnetic contact-breaker 51 (Fig. 7) the movable contact 52 of which co-operates with two fixed contacts 53. The energising winding of said electro-magnetic contact-breaker is arranged in a circuit 56 which is connected to a source of electricity not shown. In said circuit are interposed a control switch 57 which is within reach of the pilot and the energising winding 58 of a relay or contact breaker 59 which is interposed in the supply circuit 55 of the motor 6 and is placed at a fixed point on the aircraft. The electro-magnetic contact-breaker 51 is in this case provided with two windings 60 and 61 of different resistances. The higher resistance winding 60 is connected to the source of electricity by a conductor 62 and a conductor 63 connected to the circuit 56 at a point located between the electro-magnet 51 and the control switch 57. The other winding 61 of much lower resistance is inserted in a circuit 64 which is in parallel with the circuit 56, 63, 62 of the winding 60 and which is provided with a switch 65 carried by the catch bar 22a, and actuated by the sliding rod 48 as the contact breaker 47 in Fig. 2. In the circuit of the winding 60 is interposed a switch 68 which is in this case carried by a branch 8 of the folding strut and co-operates with a projection 69 carried by the other branch 9 in such a manner as to open responsive to the action of said projection 69 when the undercarriage reaches its retracted position.

When the undercarriage is locked in the landing position, the switch 65 is closed and the switch 68 is closed whereas the control button 57 is open. By depressing button 57, by means of a lever adapted to take up several positions, the pilot closes the circuit 62, 63, 60, 56 and also the parallel circuit 64, 61. The two windings 60 and 61 of the electromagnetic contact-breaker are thus energized and the core 50, by means of the rod 49 and the lever 39a, pulls the locking member 36a which is retracted, thereby enabling the hooks 31 to be retracted in turn by the action of springs similar to springs 35 shown on Fig. 3. At the same time, the retraction of the member 36a allows the rod 48 to slide outwardly by the action of its retracting spring, thereby opening the switch 65 and cutting out the low resistance winding 61. Towards the end of its travel, that is to say when unlocking has been effected, the core 50 brings the movable contact 52 into contact with the fixed contacts 53 and closes the circuit of the winding 58 of the contact-breaker 59; the latter closes and the current is supplied by the circuit 55 to the motor 6 which rotates and actuates the retracting mechanism. At the end of the retraction, at the instant when locking is being effected in the high position, the projection 69 encounters the switch 68 and compels it to open, thereby breaking the circuit 56; the contact-breaker 59 opens and breaks the supply circuit 55 of the motor which stops. By operating another button, but by means of the same lever which served to push the button 57, the latter is released, thereby breaking the circuit of the electromagnetic contact-breaker 51, the undercarriage is lowered by the action of known means which are not shown herein, the switch 68 closes as soon as the lowering begins, and at the instant when the undercarriage is locked in the landing position, the locking member 36a pushes the rod 48 endwise, thereby closing the switch 65.

In the modified embodiment just described the electric control of the locking device replaces the mechanical control by a cam and a resilient device as described above with reference to Fig. 1.

The device for locking the undercarriage in the retracted position is shown in detail in Fig. 8. It is similar to the one described above for locking the undercarriage in the landing position. However, the locking member 36b of the catch rod differs from the member 36a, mainly by the fact that it is a floating member. The member 36b is provided with a groove 71 through which passes a fixed pin 72 and said member is pivoted at 73 on a two-arm lever 74 which is itself pivotally connected at its ends 75 and 76 to respective levers 77 and 78 which are pivoted at fixed points 79 and 80 on a frame 81. The retracting springs 35b for the hooks 31b are directly stretched between said hooks and the levers 77, 78. Said floating member 36b can thus swing about the pivot 72, while continuing to keep the hooks substantially in their engaged position. If therefore at the instant of the engagement the catch rod 22b rigidly carried by the bar 9 does not place itself accurately between the two hooks 31b but strikes one of the hooks 31b, it deflects the latter by causing it to swing slightly about its pivot, which movement rocks the floating member 36b about its pivot 72 and, through said member, the other hook 31b, and the rod 22b thus nevertheless lodges itself in the engaging position between the two hooks 31b.

For unlocking, the lever 77 is rotated in the direction f2, against the action of the springs 35b thereby causing the member 36b to slide on the pin 72 and releasing the hooks 31b which are then retracted by the pull of said springs 35b. The rotation of the lever 77 is obtained by means of an extension 82 of said lever and the action of a control finger 83 which is pivoted at a fixed point 84 and to which is attached an actuating cable or rod 86. This finger 83 can be pushed by the rod 87 of a small piston adapted to move in a fixed pneumatic cylinder 88. The end of the cable 86 is attached to a lever 89 within reach of the pilot and which also serves to depress the button 57 of Fig. 6, and the cylinder 88 is supplied with compressed air through a pipe 91 extending from a self-closing cock 92 of known type, to which compressed air is supplied through a pipe 93 and which is arranged adjacent the lever 89 which is provided with a cam 94 adapted to open said cock 92 temporarily at the same time as the cable 86 pulls the finger 83.

When the lever 89 is in the position I shown in Fig. 10, the whole of the locking device is in locking position. When the pilot brings said lever 89 into the position II, he pulls the finger 83 and at the same time momentarily opens the cock 92, thereby admitting compressed air into the cylinder 88, the piston of which then pushes said finger 83 by means of the rod 87. The lever 77 is therefore actuated by two control devices acting simultaneously. By moving the lever 89 from the position I to the position III, the device for locking the undercarriage in the retracted position remains inoperative whereas the button 57 of Fig. 6 is depressed, thereby causing the device for locking the undercarriage in the landing position to open and the retracting device to become operative, as previously described.

Of course, the invention is in nowise limited to the details of construction illustrated or described, which have only been given by way of example.

What I claim is:

1. In the combination of an operating mechanism for retractable members on aircrafts with locking means to actuate same in the unlocking erating mechanism in a predetermined position, an electric motor adapted to actuate said operating mechanism, an electric supply circuit for said motor, a relay in said circuit, an electromagnetic contact-breaker, an electric control circuit, means responsive to the operation of said mechanism and including a switch in said control circuit to break the latter when the retractable member reaches its retracted position, said electromagnetic contact-breaker including an energizing winding inserted in said control circuit and a movable core operatively connected to said locking means to actaute same in the unlocking direction when said winding is energised, and an energizing circuit for said relay, said electromagnetic contact-breaker being inserted in said energizing circuit and its contacts being so arranged that the travel of the core required for the release of said locking device is shorter than that required for closing the contact-breaker.

2. In the combination as in claim 1, said electromagnetic contact-breaker including two windings of different resistances connected in parallel, said switch being inserted in the circuit of the higher resistance winding, and means responsive to the operation of said mechanism and including a switch in the lower resistance circuit to cut the latter when the retractable member is moved out of its projecting position.

3. In the combination of an operating mechanism for retractable members on aircrafts with locking means so arranged as to lock said operating mechanism in the retracted position of said member and control means for said locking means, said control means including two sets of control members including a common hand actuated lever arranged to set them operating at the same time, each of said sets being capable of actuating said locking means to release the operating mechanism.

4. In the combination as in claim 3, said control means including a source of energy for energizing one of said sets, the other set being arranged to be energized by a source of energy of a different nature.

5. In the combination as in claim 3, one of said sets comprising means adapted to transmit a movement, said means connecting the hand lever to the locking device, and the other set comprises pneumatically actuatable members, means supplying air under pressure and a valve operable by said hand lever and connected to said supplying means and said pneumatically actuatable members to control the supply of air pressure thereto.

6. In the combination of an operating mechanism for retractable members on aircraft with locking means so arranged as to lock said operating mechanism in a predetermined position, motor means adapted to actuate said operating mechanism, a control circuit for said motor means, a relay in said control circuit, an electro-magnetic contact breaker including a movable core operatively connected to said locking means to actuate same in the unlocking direction when said electro-magnetic contact breaker is energized, and connecting means between said relay and said contact breaker arranged to operate said relay after the end of the stroke of said core required for the release of the locking device.

7. In the combination of an operating mechanism for retractable members on aircraft with locking means so arranged as to lock said operating mechanism in a predetermined position, a motor adapted to actuate said operating mechanism, a control relay for said motor, a control member for said locking means, an operative connection between said control member and said control relay whereby said control relay is excited responsive to the release of said locking means, and means for actuating said control member.

8. In a collapsible linkage for a retractable member on aircraft, comprising a supporting leg for said retractable member hinged on the aircraft structure and a folding strut hinged at both its ends on the said structure and on the said supporting leg respectively a locking device for locking said collapsible linkage in its extended position, said locking device comprising two parts carried respectively by said folding strut and by said supporting leg, one of said parts including a headed arm and the other part including catch means arranged to engage the said headed arm when the linkage is in its extended position, whereby said locking means form a brace between said supporting leg and said folding strut in extended position.

9. In a collapsible linkage for a retractable member on aircraft comprising a supporting leg for said retractable member hinged on the aircraft structure and a folding strut hinged on both its ends on the said structure and on the said supporting leg respectively, said folding strut being formed by two members connected together by a hinge, a locking device for locking said collapsible linkage in its extended position, said locking device comprising two parts carried respectively by said hinge and by said supporting leg, one of said parts including a headed arm and the other including catch means arranged to engage said headed arm when the linkage is in its extended position whereby forming a brace between said supporting leg and the said hinge.

10. A locking device as claimed in claim 8, in which said part including a headed arm is pivotally carried and spring loaded so as to move into its engaging position automatically.

11. In a collapsible linkage for a retractable member on aircraft comprising two coupled supporting legs, for said retractable member, hinged on the aircraft structure and two coupled folding struts, cooperating with said legs respectively, each of said folding struts being hinged on both its ends on the said structure and on the cooperating supporting leg respectively and being formed by two members connected together by a hinge, the hinges of the two folding struts being coaxial and carried by a common bracing member, a locking device for locking said collapsible linkage in its extended position, said locking device comprising two parts carried respectively by said bracing member and by said legs, one of said parts including a headed arm and the other part including catch means arranged to engage said headed arm when the linkage is in its extended position whereby forming a brace between said legs and said struts.

12. A locking device as claimed in claim 11, in which the said first named part comprises two arms rigidly connected to form a substantially V-shaped assembly and a head carried at the apex of said assembly, the said assembly being pivotally carried and spring loaded so as to move into the engaging position automatically.

13. A locking device as claimed in claim 11, in which said first named part comprises two arms pivotally carried by the respective legs and rigidly connected to form a substantially V-shaped assembly and a head carried at the apex, the said arms being spring loaded so as to move into the engaging position automatically.

14. A locking device as claimed in claim 11, including further resilient means between said bracing member and the parts of the struts carrying said last named member.

15. In a collapsible linkage for a retractable member on aircraft, locking means for holding the linkage in one of its extreme positions, said locking means including a head, a pair of hooks mounted to swing upon engagement of said head to maintain the same, said hooks being provided with tails, resilient means loading said hooks and mounted to have their lines of action passing on one side or the other of the swinging axis of the corresponding hooks according to the position of the latter, a movable locking member adapted to engage the tails of the hooks when same are in the locking position, resilient means urging said locking member towards its engaging position, and control means for disengaging said locking member.

16. A collapsible linkage as claimed in claim 15, including further motor means for retracting the linkage, a control circuit for said motor means, a relay in said control circuit, an operative connection between said control means and said relay whereby said relay is operated responsive to the disengagement of said locking member.

CHARLES RAYMOND WASEIGE.